United States Patent
Lee et al.

(10) Patent No.: US 12,326,505 B2
(45) Date of Patent: Jun. 10, 2025

(54) OBJECT SHAPE DETECTION APPARATUS AND METHOD

(71) Applicant: Vueron Technology Co., Ltd, Seoul (KR)

(72) Inventors: Seungyong Lee, Goyang-si (KR); Changhwan Chun, Seoul (KR)

(73) Assignee: Vueron Technology Co., Ltd, Seoul (KR)

( * ) Notice: Subject to any disclaimer, the term of this patent is extended or adjusted under 35 U.S.C. 154(b) by 974 days.

(21) Appl. No.: 17/399,475

(22) Filed: Aug. 11, 2021

(65) Prior Publication Data

US 2022/0229186 A1      Jul. 21, 2022

(30) Foreign Application Priority Data

Jan. 19, 2021 (KR) ................ 10-2021-0007695

(51) Int. Cl.
  *G01S 17/89* (2020.01)
  *G01B 11/25* (2006.01)
  *G06K 9/00* (2022.01)
  *G06T 7/521* (2017.01)
  *G06V 20/58* (2022.01)

(52) U.S. Cl.
  CPC .......... *G01S 17/89* (2013.01); *G01B 11/2518* (2013.01); *G06T 7/521* (2017.01); *G06V 20/58* (2022.01)

(58) Field of Classification Search
  CPC ...... G01S 17/89; G01S 17/931; G01S 7/4817; G01S 17/06; G01B 11/2518; G06T 7/521; G06T 7/11; G06V 20/58; G06V 10/44; G06V 10/46; G06V 20/64

USPC .......................................................... 382/103
See application file for complete search history.

(56) References Cited

U.S. PATENT DOCUMENTS

| | | | |
|---|---|---|---|
| 2003/0085892 A1* | 5/2003 | Mashimo | G06F 30/23 345/420 |
| 2012/0320383 A1* | 12/2012 | Dubois | G01N 29/043 356/502 |
| 2013/0325311 A1* | 12/2013 | Yoo | G08G 1/16 701/301 |
| 2014/0062759 A1* | 3/2014 | Morikawa | G01S 17/42 342/146 |
| 2015/0339833 A1* | 11/2015 | Harada | H04N 13/275 348/135 |
| 2017/0357850 A1* | 12/2017 | Lee | G01S 7/4802 |
| 2019/0171212 A1* | 6/2019 | Wang | G05D 1/0246 |
| 2019/0394435 A1* | 12/2019 | Uemura | G06T 3/00 |
| 2020/0114509 A1* | 4/2020 | Lee | G01S 15/931 |

(Continued)

FOREIGN PATENT DOCUMENTS

| | | |
|---|---|---|
| JP | 2020-026981 A | 2/2020 |
| KR | 101858902 B1 | 5/2018 |
| KR | 10-2020-0126141 A | 11/2020 |

*Primary Examiner* — Quang N Vo
(74) *Attorney, Agent, or Firm* — Bridgeway IP Law Group, PLLC; Jihun Kim

(57) ABSTRACT

An object shape detection method. The method includes determining an area estimated as one object from scanning information obtained by scanning around the moving object; obtaining line information of the one object; generating pattern shapes each of which one side includes at least part of the line information; and selecting a representative pattern shape of the one object corresponding to a shape of an object by using the scanning information.

11 Claims, 15 Drawing Sheets

(56) References Cited

U.S. PATENT DOCUMENTS

| | | | | |
|---|---|---|---|---|
| 2020/0117947 A1* | 4/2020 | Mei | .......................... | G06T 7/11 |
| 2021/0312633 A1* | 10/2021 | Noh | .......................... | G06T 7/12 |
| 2022/0012942 A1* | 1/2022 | Hu | .......................... | G06T 17/20 |

* cited by examiner

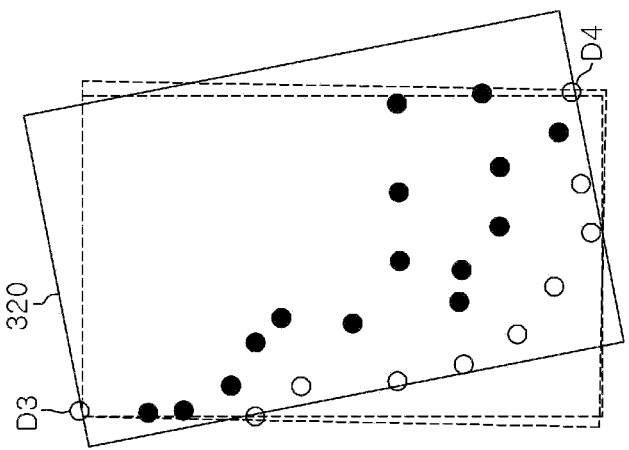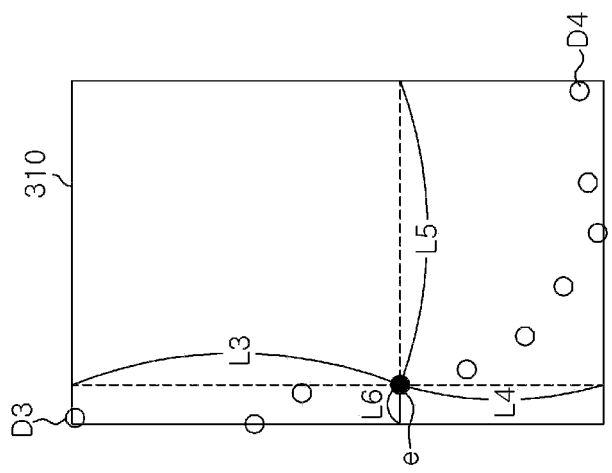

OBJECT SHAPE DETECTION APPARATUS AND METHOD

CROSS-REFERENCE TO RELATED APPLICATION

This application claims priority to Korean Patent Application No. 10-2021-0007695, filed on Jan. 19, 2021. The entire contents of the application on which the priority is based are incorporated herein by reference.

TECHNICAL FIELD

The present disclosure relates to an object shape detection apparatus for detecting a shape of objects around a moving vehicle and a method thereof.

BACKGROUND

It is essential to detect shape information of objects around the vehicle during autonomous driving. The shape information of an object is essential when object classifying and object tracking in a perception field, and can be used to improve the performance of Localization technology or decision technology.

In the case of object tracking, since it is impossible to track all points detected by the lidar sensor, the shape information capable of expressing the points detected from an object as a single object is required. In addition, accurate detection of the shape information of an object has a great influence on the performance of tracking technology. Further, also in the case of object classification, since performing object classification by using all points places a significant load on the computation speed, it is necessary to express a specific object as simple shape information of the object. The object shape detection technology can be of great help, by using accurate object shape information not only in the object perception field but also in the Localization technology or the autonomous driving decision technology other than the perception field, in improving performance thereon.

The object shape detection technology needs to consider various environments. It should be possible to detect the shape of the object with the same performance in various lidar sensors, and a detection method that is not affected by other sensors is required.

In addition, not only the perception, decision, and control technology must operate within the input cycle of the lidar sensor, but also the ground removal and clustering, shape detection, classification, and tracking steps for all objects must be performed in object perception.

Accordingly, a technology capable of processing all points representing an object within a limited computation time and detecting accurate object shape information without being affected by various sensor types, is required.

SUMMARY

A problem to be solved according to an embodiment of the present disclosure includes detecting a shape of an object in order to detect an object around a vehicle during autonomous driving using a lidar sensor.

In addition, it includes detecting object shape information quickly and accurately.

In accordance with an aspect of the present disclosure, there is provided an object shape detection method performed by an object shape detection apparatus in order to detect an object around a moving object. The method comprises, determining an area estimated as one object from scanning information obtained by scanning around the moving object; obtaining line information of the one object in order to extract a shape of the one object; generating pattern shapes each of which one side includes at least part of the line information by using the line information; and selecting, from the generated pattern shapes, a representative pattern shape of the one object corresponding to a shape of an object by using the scanning information.

Herein, the scanning information includes point data for a plurality of scanning points obtained through an external lidar sensor.

Herein, the point data includes three-dimensional coordinate information.

Herein, the obtaining the line information includes: projecting the plurality of the scanning points onto one plane; and determining outer points of an object from the plurality of the projected scanning points based on each polar coordinates of the point data in a case of converting two-dimensional coordinates of each data point from a corresponding coordinate system to a two-dimensional polar coordinate system around the moving object.

Herein, the determining the outer points of the object includes: assigning an index value to the plurality of the projected scanning points sequentially according to a size of a scanning angle; generating a first connection line based on an order in which the index values are assigned by connecting an $N_{th}$ point and an $N+2_{th}$ point (herein, N is a natural number greater than or equal to 1); calculating a length of a second connection line connecting an $N+1_{th}$ point and a reference point that is two-dimensional coordinates of the lidar sensor; and comparing a perpendicular distance from the reference point to the first connection line with the length of the second connection line and determining the $N+1_{th}$ point as the outer point if the length of the second connection line is shorter than the perpendicular distance.

Herein, the obtaining the line information further includes generating each of a plurality of outer lines by connecting two outer points closest to each other among the determined outer points and obtaining the line information by connecting the generated outer lines.

Herein the generating the pattern shapes is generating a polygonal pattern shape of which one side includes one outer line among the plurality of the outer lines, and wherein all point data of the one object is included in the polygonal pattern shape.

Herein, the generating the pattern shapes is excluding, from the polygonal pattern shapes, one of pattern shapes generated from outer lines perpendicular to each other among the plurality of the outer lines.

Herein, the pattern shapes take a rectangular form in which all the outer points are included, and each of the pattern shapes has a different arrangement angle from each other, and the selecting the representative pattern shape includes: selecting a first representative point having a minimum angle and a second representative point having a maximum angle from among the plurality of the projected scanning points; selecting a plurality of representative points between the first representative point and the second representative point; obtaining aggregate distance value by calculating and adding up distances to a closest side among four sides of one pattern shape among the pattern shapes from each of all representative points including the first representative point and the second representative point and the plurality of the representative points; performing a step of obtaining the aggregate distance value repeatedly for each of other pattern shapes other than the one pattern shape; and selecting, as the representative pattern shape, a pattern shape corresponding to a smallest aggregate distance value among the aggregate distance values obtained for each pattern shape.

Herein the obtaining the line information further includes, before the projecting the plurality of the scanning points onto the one plane, setting a predetermined height interval in a vertical direction, and classifying the plurality of the scanning points according to the predetermined height interval.

In accordance with another aspect of the present disclosure, there is provided an object shape detection apparatus in order to detect an object around a moving object. The apparatus comprises, a memory configured to store scanning information obtained by scanning around the moving object; and a processor configured to detect a shape of the object from the scanning information, and wherein the processor is configured to determine an area estimated as one object from the scanning information, obtain line information of the one object in order to extract a shape of the one object, generate pattern shapes each of which one side includes at least part of the line information by using the line information, and select a representative patter shape corresponding to the shape of the one object from the generated pattern shapes by using the scanning information.

In accordance with still another aspect of the present disclosure, there is provided a non-transitory computer-readable storage medium storing a computer program, wherein the computer program includes an instruction, when executed by a processor, causes the processor to perform an object shape detection method. The method comprises, determining an area estimated as one object from scanning information obtained by scanning around a moving object; obtaining line information of the one object in order to extract a shape of the one object; generating pattern shapes each of which one side includes at least part of the line information by using the line information; and selecting, from the generated pattern shapes, a representative pattern shape corresponding to the shape of the one object by using the scanning information.

In accordance with still another aspect of the present disclosure, there is provided a computer program stored in a non-transitory computer-readable storage medium, wherein the computer program includes an instruction, when executed by a processor, causes the processor to perform an object shape detection method. The method comprises, determining an area estimated as one object from scanning information obtained by scanning around a moving object; obtaining line information of the one object in order to extract a shape of the one object; generating pattern shapes each of which one side includes at least part of the line information by using the line information; and selecting, from the generated pattern shapes, a representative pattern shape corresponding to the shape of the one object by using the scanning information.

As described above, according to embodiments of the present disclosure, object shape information used for recognizing surrounding objects of an autonomous vehicle using the lidar sensor may be accurately and quickly detected and provided.

Further, since height information is included when matching with information of a high-definition map by providing a contour according to a predetermined height interval, accurate position recognition may be performed.

Furthermore, it is possible to accurately identify a position of an object, and to perform, based thereon, generating a more accurate route and determining a more accurate driving situation.

BRIEF DESCRIPTION OF THE DRAWINGS

FIG. 15A shows a diagram illustrating a representative pattern shape in an object shape detection method according to an embodiment of the present disclosure.

FIG. 15B shows a diagram illustrating a representative pattern shape in an object shape detection method according to an embodiment of the present disclosure.

DETAILED DESCRIPTION OF THE EMBODIMENTS

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
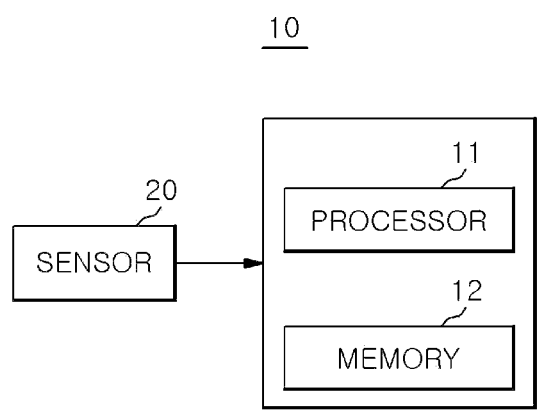
FIG. 1 shows a block diagram illustrating an object shape detection apparatus according to an embodiment of the present disclosure.

FIG. 1 shows a block diagram illustrating an object shape detection apparatus 10 according to an embodiment of the present disclosure.

Referring to FIG. 1, the object shape detection apparatus 10 according to an embodiment of the present disclosure includes a processor 11 and a memory 12.

The object shape detection apparatus 10 according to an embodiment of the present disclosure is an apparatus that may be provided on a moving object to detect an object around the moving vehicle.

Herein, the moving vehicle includes a vehicle capable of autonomous driving or capable of autonomous driving at least in part, and there is no particular limitation on the type of the vehicle.

The object is positioned around the moving object and may include buildings, trees, obstacles, etc. that the vehicle recognizes during traveling.

Detecting shape information of the objects around the vehicle may be performed during autonomous driving. The shape information of the object may be used when classifying and tracking the object in a perception field, and may be used to improve the performance of localization technology or autonomous driving decision technology.

The object shape detection apparatus 10 according to an embodiment of the present disclosure is for detecting the shape information of the object that is preferentially performed to track the object. In order to detect accurate object shape information, a contour estimated to be the object may be detected so that a representative pattern shape may be generated based on the contour, and the representative pattern shape may be selected by using a representative point, thereby performing an object shape detection quickly and accurately.

Herein, the detected object shape information may be used not only for object classification and tracking, but also for enhancing the performance in a localization and decision process.

The memory 12 included in the object shape detection apparatus 10 according to an embodiment of the present disclosure may store programs (one or more instructions) for processing and control over the processor 11, and scanning information obtained by scanning around the moving object that is input from a sensor 20. Further, the memory 12 may include a computer-readable storage medium of at least one type of a memory of a flash memory type, a hard disk type, a multimedia card micro type, and a card type (e.g., an SD memory or an XD memory), a Random-Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk.

Herein, the sensor 20 may be positioned outside the object shape detection apparatus 10 and may be provided in the moving object. Specifically, the sensor 20 may be a lidar sensor, and the scanning information that scanned around the moving object and is stored in the memory 12 may include point data for a plurality of scanning points obtained through the lidar sensor.

The programs stored in the memory 12 may be divided into a plurality of modules according to functions.

The processor 11 executes one or more instructions stored in the memory 12. Specifically, the processor 11 determines scanning information for each area estimated to be an object, obtains line information of one object in order to extract a shape of the determined one object, generates pattern shapes each of which one side includes at least part of the line information by using the line information, and selects, from among the generated pattern shapes, a representative pattern shape corresponding to the shape of the one object by using the scanning information.

Herein, the processor 11 may be divided into a plurality of modules according to functions, or the single processor 11 may perform the functions. The processor 11 may include one or more of a central processing unit (CPU), an application processor (AP), a micro controller unit (MCU), or a communication processor (CP).

Figure 2:
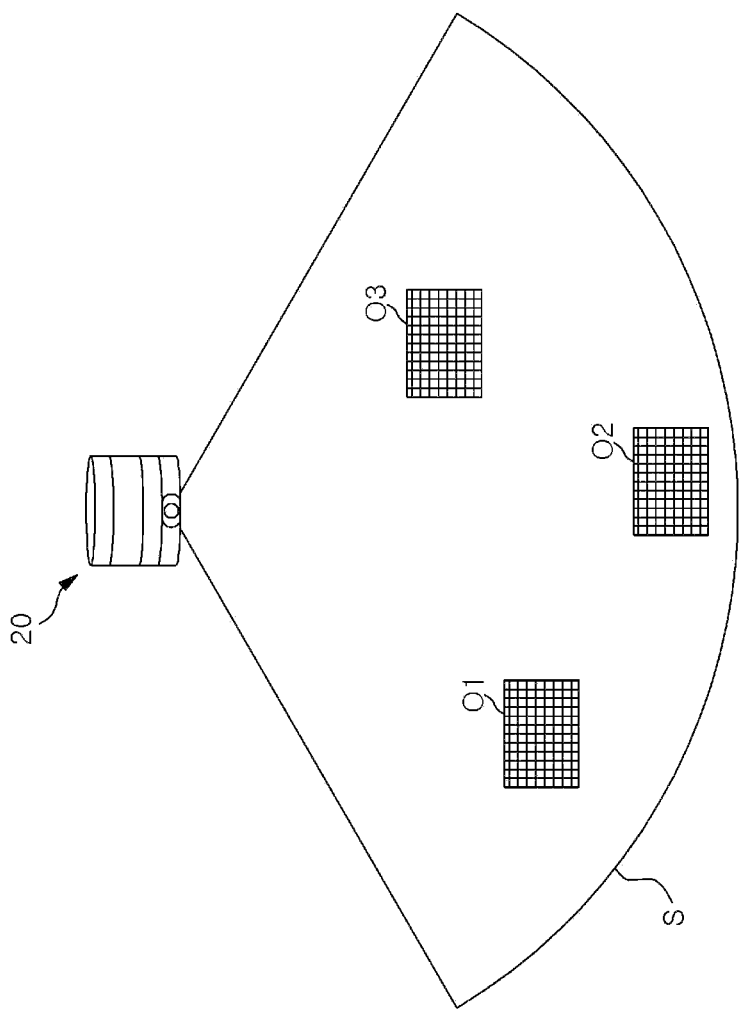
FIG. 2 shows a diagram illustrating lidar sensor information used by an object shape detection apparatus according to an embodiment of the present disclosure.

FIG. 2 shows a diagram illustrating lidar sensor information used by the object shape detection apparatus 10 according to an embodiment of the present disclosure.

The object shape detection apparatus 10 according to an embodiment of the present disclosure receives scanning information obtained by scanning around a moving object through the sensor 20.

Herein, the scanning information is point data for a plurality of scanning points obtained through a lidar sensor.

Referring to FIG. 2, the sensor 20 may rotate in a range of a predetermined angle and may detect a plurality of objects O1, O2, and O3 positioned in an area S. Herein, the sensor 20 may be provided in the moving object, and thus, a position of the sensor 20 may correspond to a position of the moving object.

In a case of object tracking, since it is difficult to track all points detected by the lidar sensor, shape information capable of expressing the points detected from the object as a single object may be used. In addition, accurate detection of shape information of an object has a great influence on the performance of object tracking technology. Further, also in a case of object classification, since performing the object classification by using all points places a significant load on computation speed, a specific object may be expressed as simple shape information of the object.

To this end, the object shape detection apparatus 10 according to an embodiment of the present disclosure determines each of the objects O1, O2, and O3 by determining each area estimated to be an object from the scanning information around the moving object, and extracts a shape according to each object.

An object shape detection technology may consider various environments. First, it may be possible to detect the shape of the object with the same performance in various lidar sensors. Since there are various kinds of lidar sensors, and multiple sensors or various kinds of sensors may be installed in one vehicle, a detection method that is not affected by environments may be used.

For example, sensors used for autonomous vehicles include radar, lidar, a camera, and the like. The lidar sensor may be disposed in the front of the vehicle, the rear of the vehicle, the side, or the roof, and the like. According to an embodiment, the vehicle may include a plurality of lidar sensors that are installed in all directions, for example, in the front, the rear, the left side, and the right side of the vehicle.

Since the object shape detection apparatus 10 according to an embodiment of the present disclosure receives scanning information from the lidar sensor, projects three-dimensional points onto a two-dimensional plane, and selects a representative point, it may not be affected by positions or sensor specifications of other sensors and a position where the lidar sensor is attached.

In addition, an input period of a general lidar sensor is about 100 ms. Within the input period, not only perception, decision, and control technology should be operated, but also road surface removal and steps of clustering, shape estimation, classification, and tracking for all objects should be performed in the case of object perception in the perception field. In this situation, the computation time that can be used to detect the object shape is limited. The object shape detection may be performed in consideration of these various situations, and the detection result may affect not only object classification and tracking but also localization or decision process.

The object shape detection apparatus 10 according to an embodiment of the present disclosure determines each of the objects O1, O2, O3 for an area that is estimated to be an object in the scanning information as a single object, and detects a contour according to each object based on a representative point among scanning points, no based on all scanning points in the single object, thereby extracting the object shape based on the detected contour.

In addition, as to be described in FIG. 12 below, the object shape shape apparatus 10 removes overlapped pattern shapes among a plurality of pattern shapes. Further, as to be described in FIGS. 15A and 15B below, the object shape apparatus 10 calculates error values of candidate boxes and determines a candidate box having the minimum error value among the candidate boxes as an optimal box (i.e., final representative pattern shape) representing the object, thereby extracting the object shape so that the computation time may be reduced and the shape for each object may be detected for every area.

Figure 3:
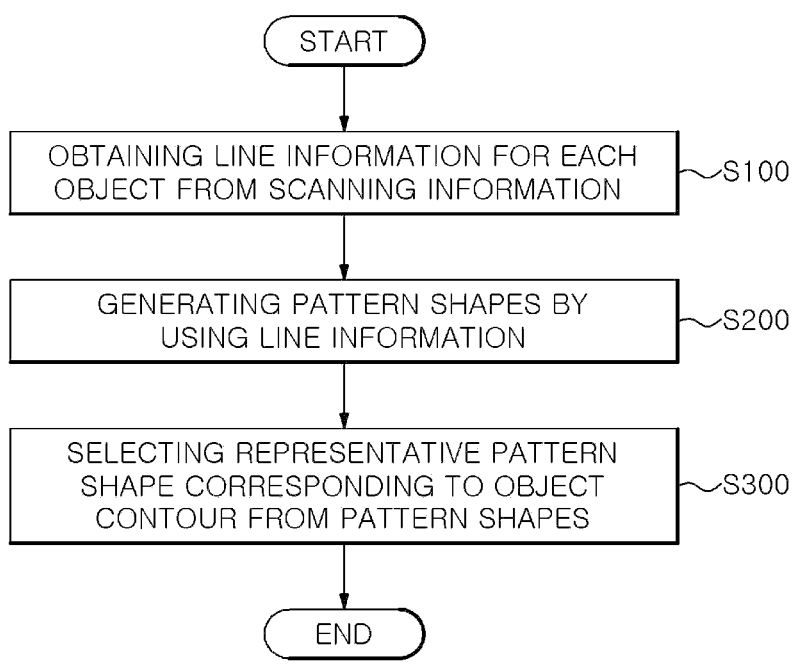
FIG. 3 shows a flowchart illustrating an object shape detection method according to an embodiment of the present disclosure.

FIG. 3 shows a flowchart illustrating an object shape detection method according to an embodiment of the present disclosure.

The object shape detection method of FIG. 3 includes following steps performed in a time-series by the processor 11 shown in FIG. 1.

Referring to FIG. 3, the object shape detection method according to an embodiment of the present disclosure is performed by the object shape detection apparatus 10 to detect an object around a moving object. In a step S100, the object shape detection apparatus 10 determines each area estimated to be an object from scanning information obtained by scanning around the moving object, and obtains line information of one object in order to extract a shape of the determined one object.

Herein, the scanning information that scanned around the moving object is point data for a plurality of scanning points obtained through an external lidar sensor. In addition, the point data has three-dimensional coordinate information.

The point data is projected onto one plane and converted from three-dimensional coordinate information to two-dimensional coordinate information to generate a pattern shape in following steps S200 and S300.

In the step S200, pattern shapes each of which one side includes at least part of the line information are generated by using the line information.

Herein, a polygonal pattern shape in which one outer line among a plurality of outer lines is included in one side is generated, and the point data of the object is included in the polygonal pattern shape.

In the step S300, from the generated pattern shapes, a representative pattern shape corresponding to the shape of the object is selected by using the scanning information.

In the steps S100 through S300, the line information includes an entire contour and a contour for each height that are obtained from a plurality of scanning points, and the entire contour, the contour for each height, and the representative pattern shape are obtained as shape information of the object.

Figure 4:
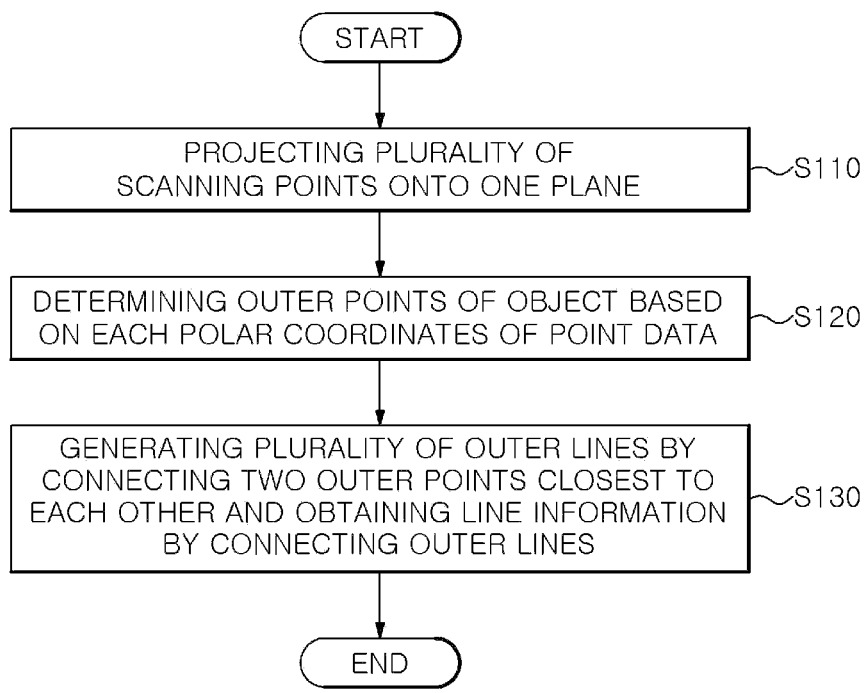
FIG. 4 shows a flowchart illustrating a step of obtaining line information in an object shape detection method according to an embodiment of the present disclosure.

FIG. 4 shows a flowchart illustrating a step of obtaining line information in an object shape detection method according to an embodiment of the present disclosure.

Referring to FIG. 4, the step S100 of obtaining the line information in the object shape detection method according to an embodiment of the present disclosure includes a step S110 of projecting a plurality of scanning points onto one plane.

In a step S120, outer points of the object are determined from among the plurality of the projected scanning points based on each polar coordinates of point data that is obtained by converting each two-dimensional coordinates of the point data from a corresponding coordinate system to a two-dimensional polar coordinate system around the moving object.

In a step S130, each of a plurality of outer lines is generated by connecting two outer points closest to each other among the determined outer points, and line information is obtained by connecting the generated outer lines.

Figure 5A:
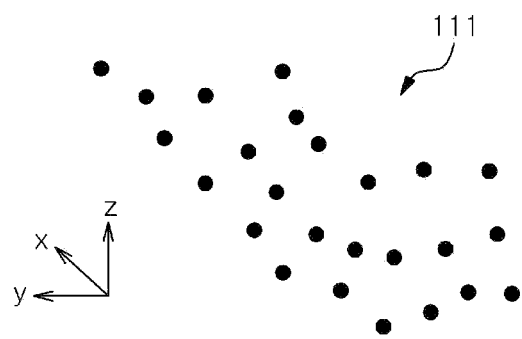
FIG. 5A shows a diagram illustrating point data in an object shape detection method according to an embodiment of the present disclosure.
Figure 5B:
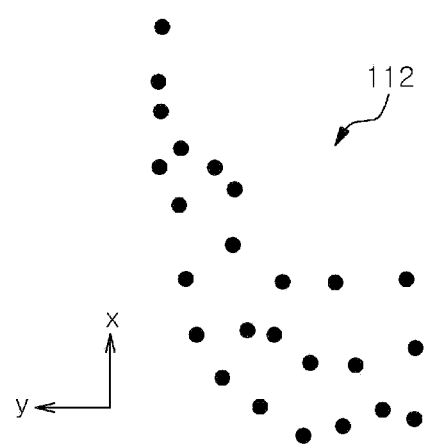
FIG. 5B shows a diagram illustrating point data in an object shape detection method according to an embodiment of the present disclosure.

FIGS. 5A and 5B show a diagram illustrating point data in an object shape detection method according to an embodiment of the present disclosure.

Scanning information obtained by scanning around a moving object is the point data for a plurality of scanning points obtained through an external lidar sensor. FIG. 5A shows point data 111 at a three-dimensional view, and FIG. 5B shows two-dimensional projected point data 112.

Figure 8:
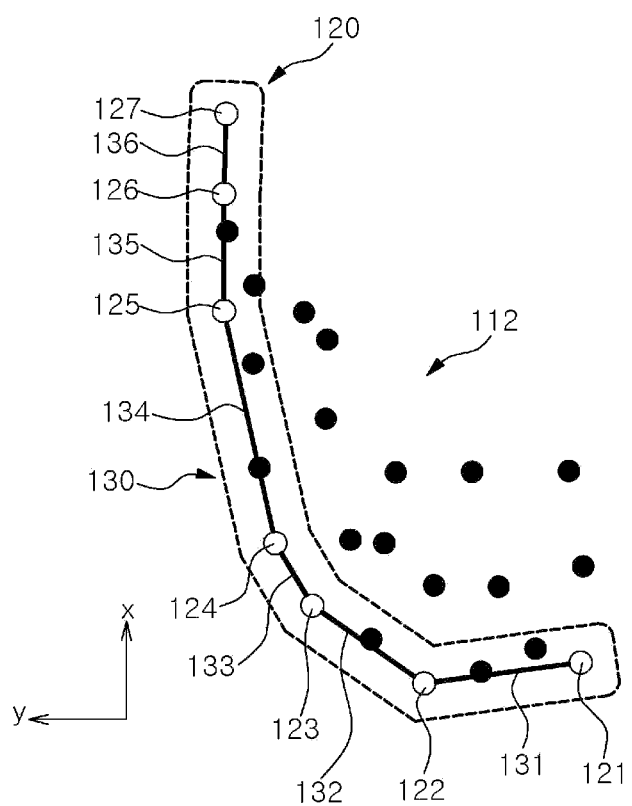
FIG. 8 shows a diagram illustrating a detection result of an entire contour in an object shape detection method according to an embodiment of the present disclosure.

In the step S100 of obtaining the line information of the object shape detection method according to an embodiment of the present disclosure, an entire contour is detected by projecting three-dimensional points onto a two-dimensional plane. An order of the two-dimensional projected points is determined according to an angle based on a position of the sensor 20, and whether each point is an outer point is determined by using an outer point detection method. The determined outer points are connected in order to detect the entire contour as shown in FIG. 8 below.

Figure 6:
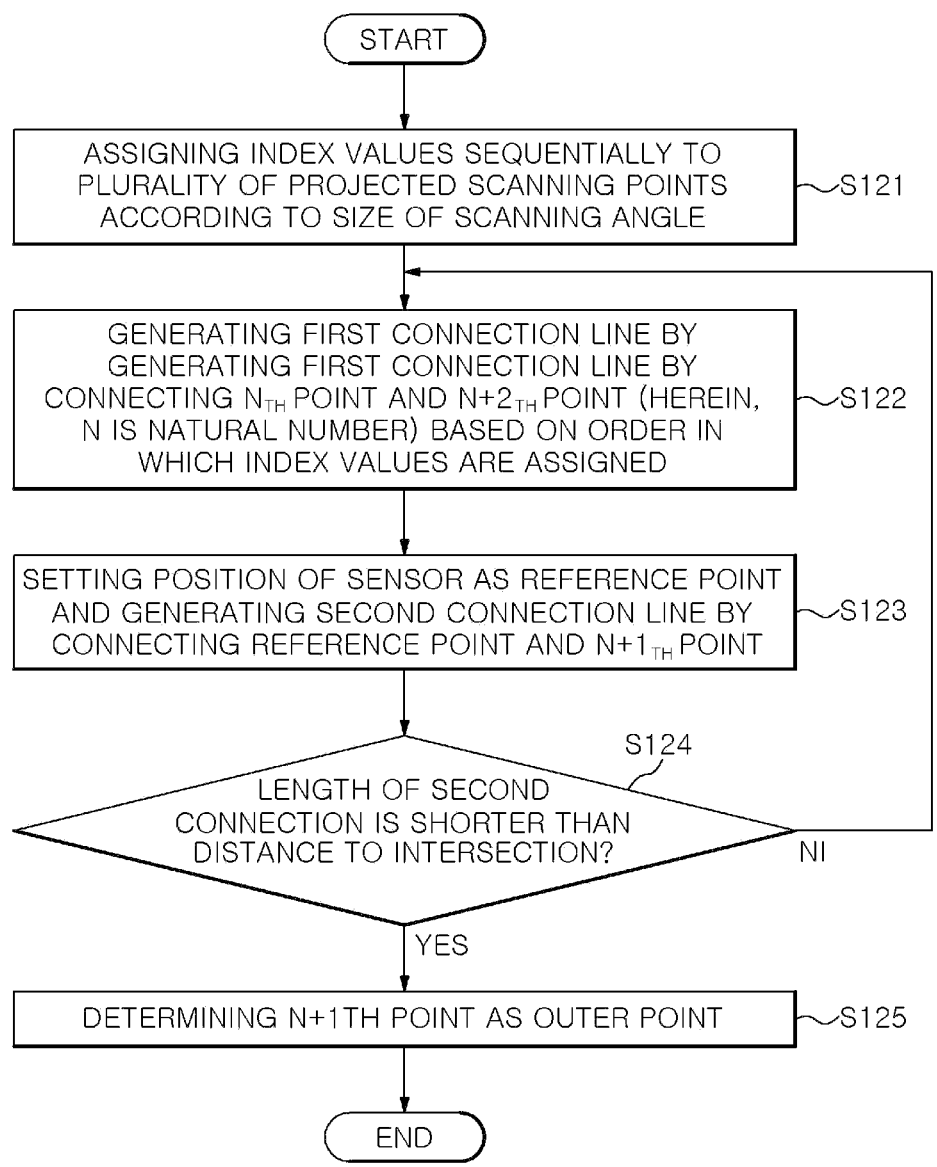
FIG. 6 shows a flowchart illustrating a step of determining outer points in an object shape detection method according to an embodiment of the present disclosure.

FIG. 6 shows a flowchart illustrating a step of determining outer points in an object shape detection method according to an embodiment of the present disclosure.

Referring to FIG. 6, the step S120 of determining the outer points in the object shape detection method according to an embodiment of the present disclosure includes a step S121 of assigning index values to a plurality of projected scanning points sequentially according to a size of a scanning angle thereof.

In a step S122, based on an order in which the index values are assigned, a first connection line is generated by connecting an $N_{th}$ point and an $N+2_{th}$ point (herein, N is a natural number greater than or equal to 1).

In a step S123, a position of the sensor 20 is used as a reference point, and a second connection line is generated by connecting the reference point and an $N+1_{th}$ point.

In a step S124, a distance from the reference point to an intersection of the first connection line and the second connection line is compared with a length of the second connection line. If the length of the second connection line is shorter than the distance to the intersection, in a step S125, the $N+1_{th}$ point is determined as the outer point.

Figure 7A:
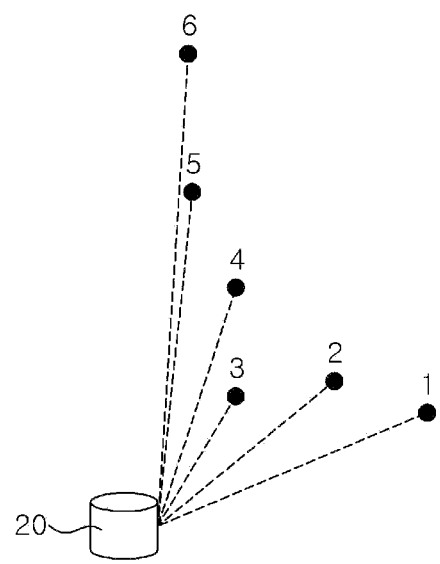
FIG. 7A shows a diagram illustrating a step of determining outer points in an object shape detection method according to an embodiment of the present disclosure.
Figure 7B:
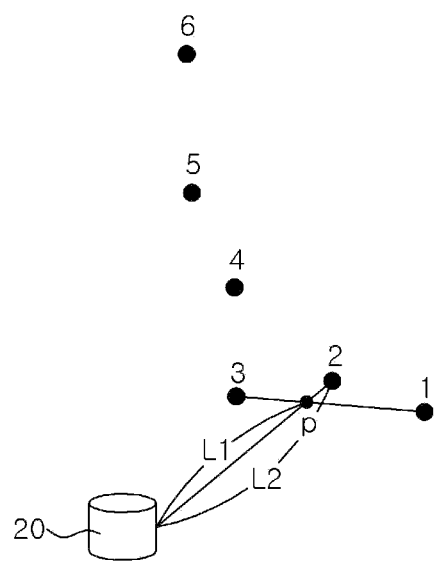
FIG. 7B shows a diagram illustrating a step of determining outer points in an object shape detection method according to an embodiment of the present disclosure.

FIGS. 7A and 7B show a diagram illustrating a step of determining outer points in an object shape detection method according to an embodiment of the present disclosure.

The outer points indicate outermost points among points within an object. FIG. 7A illustrates that index values are sequentially assigned to a plurality of projected scanning points according to a size of a scanning angle. The scanning points are arranged according to an angle based on a position of the sensor 20 to determine an order of each point. Further, according to the determined order, each point is determined whether a corresponding point is the outer point.

FIG. 7B shows a method of determining the outer point. Based on the order in which the index values are assigned, a first connection line is generated by connecting an $N_{th}$ point and an $N+2_{th}$ point (herein, N is a natural number greater than or equal to 1). In addition, a position of the sensor 20 is used as a reference point, and a second connection line is generated by connecting the reference point and an $N+1_{th}$ point. The distance from the reference point to an intersection of the first connection line and the second connection line is compared with a length of the second connection line, and if the length of the second connection line is shorter than the distance to the intersection, in the step S125, the $N+1_{th}$ point is determined as the outer point.

For example, the first connection line may be generated by connecting a first point and a third point, and the second connection line may be generated by connecting the reference point and a second point.

Herein, since a length L2 of the second connection line is longer than a distance L1 to an intersection P of the first connection line and the second connection line. Therefore, it may be seen that the second point is not an outer point, but a point positioned inside the object.

Further, a third connection line may be generated by connecting the second point and a fourth point, and a fourth connection line may be generated by connecting the reference point and the third point. Since a length of the fourth connection line is shorter than a distance to an intersection of the third connection line and the fourth connection line, the third point may be determined as the outer point.

FIG. 8 shows a diagram illustrating a detection result of an entire contour in an object shape detection method according to an embodiment of the present disclosure.

Among determined outer points 120, two outer points closest to each other are connected to each other to generate each of a plurality of outer lines, and line information is obtained by connecting the generated outer lines.

As shown in FIG. 8, outer points 121, 122, 123, 124, 125, 126, and 127 may be determined from the two-dimensional projected point data 112, and each of a plurality of outer lines 131, 132, 133, 134, 135, and 136 may be generated by connecting two outer points closest to each other. An entire line 130 connecting a plurality of the outer lines is obtained as line information.

Figure 9:
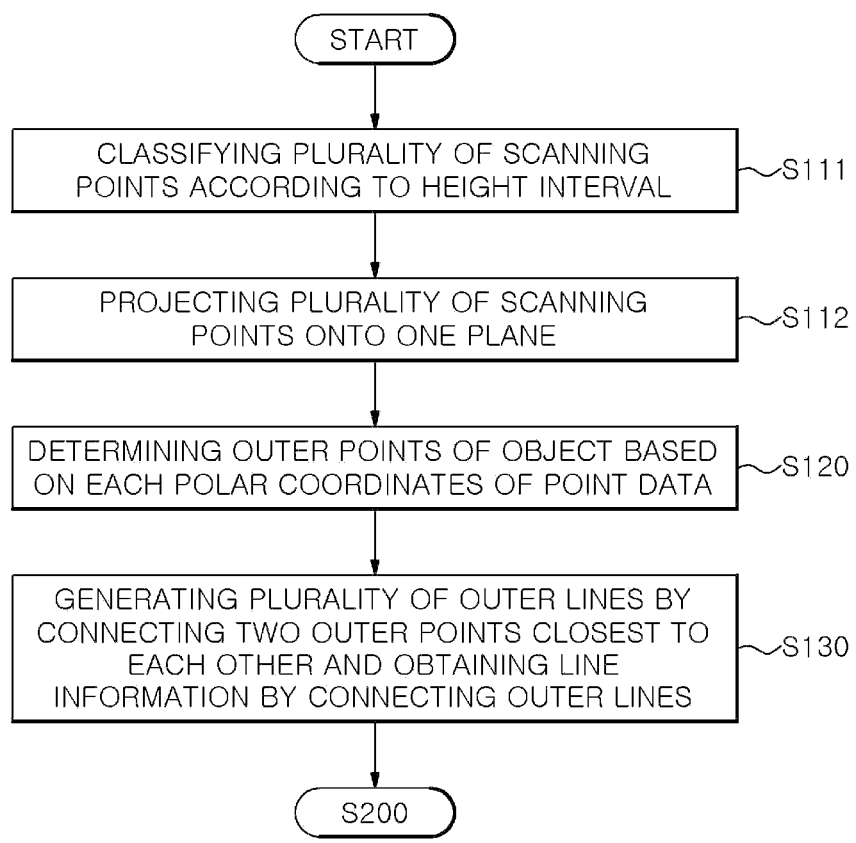
FIG. 9 shows a flowchart illustrating a step of obtaining line information for each height in an object shape detection method according to another embodiment of the present disclosure.

FIG. 9 shows a flowchart illustrating a step of obtaining line information for each height in an object shape detection method according to another embodiment of the present disclosure.

Referring to FIG. 9, the step of obtaining the line information in the object shape detection method according to another embodiment of the present disclosure includes a step S111 of setting a predetermined height interval in a vertical direction and classifying a plurality of scanning points according to the height interval.

In a step S112, a plurality of the scanning points are projected onto one plane.

In the step S120, outer points of the object are determined from among the plurality of the projected scanning points based on each polar coordinates of point data that is obtained by converting each two-dimensional coordinates of the point data from a corresponding coordinate system to a two-dimensional polar coordinate system around the moving object.

In the step S130, each of a plurality of outer lines is generated by connecting two outer points closest to each other among the determined outer points, and line information is obtained by connecting the generated outer lines.

Figure 10A:
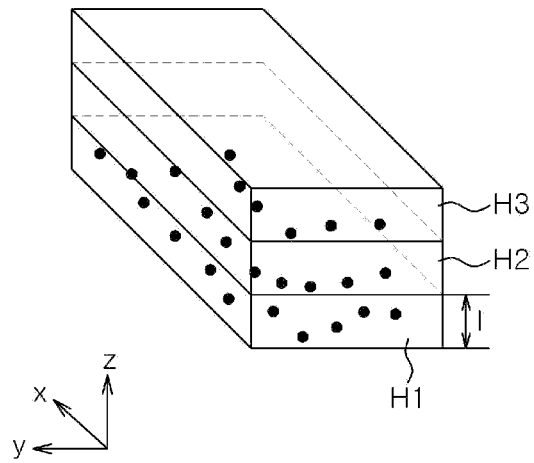
FIG. 10A shows a diagram illustrating point data for each height and a detection result of a contour for each height in an object shape detection method according to another embodiment of the present disclosure.
Figure 10B:
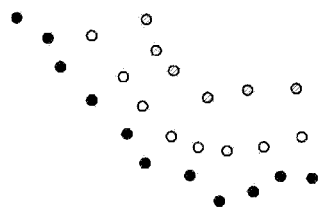
FIG. 10B shows a diagram illustrating point data for each height and a detection result of a contour for each height in an object shape detection method according to another embodiment of the present disclosure.
Figure 10C:
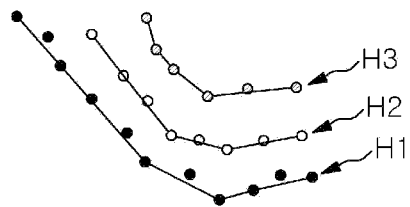
FIG. 10C shows a diagram illustrating point data for each height and a detection result of a contour for each height in an object shape detection method according to another embodiment of the present disclosure.

FIGS. 10A, 10B and 10C show a diagram illustrating point data for each height and a detection result of a contour for each height in an object shape detection method according to another embodiment of the present disclosure.

FIG. 10A shows an area for each height. A contour for each height indicates a contour detected by using points corresponding to a height of a predetermined interval. In order to detect the contour for each height, as shown in FIG. 10A, an area for each predetermined interval is set, and points corresponding to each area are collected. In other words, from the three-dimensional point data, a predetermined height interval I is set in a vertical direction, and a plurality of scanning points are assigned according to the height interval.

Herein, areas H1, H2, and H3 may be classified according to the predetermined height interval I, and FIG. 10B shows scanning points that are distinguished according to areas for each height. In this way, a contour for a corresponding area is detected by using collected points in each area. As described above with reference to FIG. 8, an order of points in each area is determined according to an angle and the contour in each of the areas H1, H2, and H3 is detected as shown in FIG. 10C by determining whether each point in each area is an outer point.

Figure 11A:
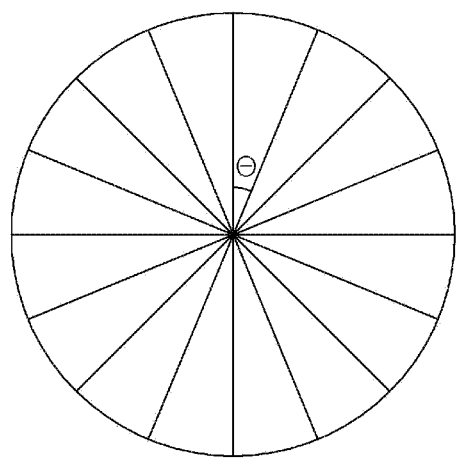
FIG. 11A shows a diagram illustrating pattern shapes in an object shape detection method according to an embodiment of the present disclosure.
Figure 11B:
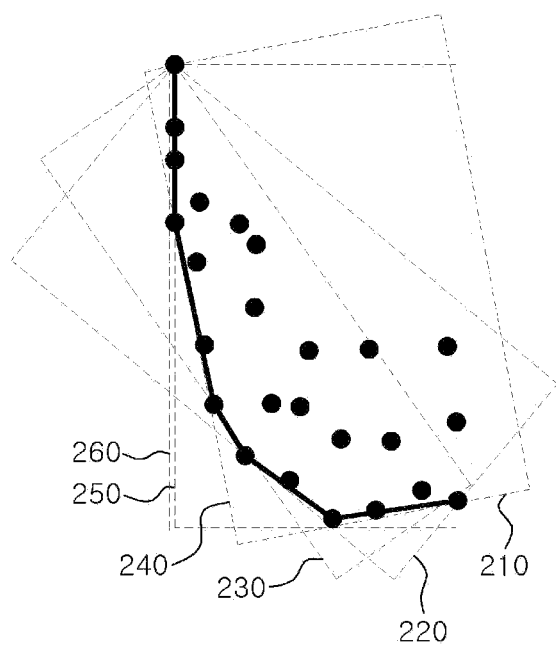
FIG. 11B shows a diagram illustrating pattern shapes in an object shape detection method according to an embodiment of the present disclosure.
Figure 12:
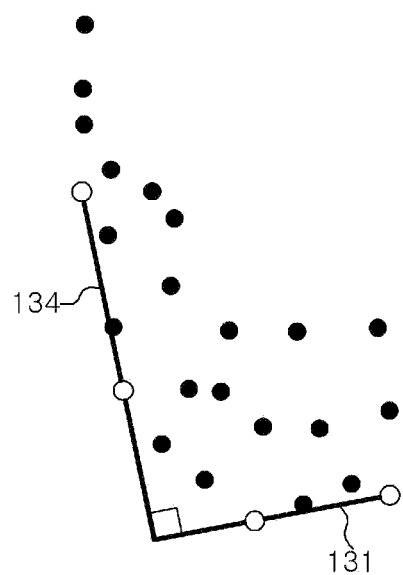
FIG. 12 shows a diagram illustrating pattern shapes in an object shape detection method according to an embodiment of the present disclosure.

FIGS. 11A, 11B and 12 show diagrams illustrating pattern shapes in an object shape detection method according to an embodiment of the present disclosure.

Referring to FIGS. 11A and 11B, the object shape detection apparatus 10 generates pattern boxes each of which one side includes at least part of line information by using the line information in the step S200.

When detecting a surrounding object through a lidar sensor, it is difficult to identify an accurate entire shape of the object because one side of the object is scanned. Accordingly, in an embodiment of the present disclosure, it is determined that a shape of an opposite side of the object that is difficult to detect through the lidar sensor is the same as a shape of a detectable side, and object shape information is detected in a form of a rectangular box.

FIG. 11A shows angular intervals for generating pattern shapes, and FIG. 11B shows the generated pattern shapes.

Herein, a pattern shape is referred to as a box, and a pattern shape for selecting a representative pattern shape is referred to as a candidate box. In order to detect a box representing a shape of an object, an embodiment of the present disclosure generates the candidate boxes and selects an optimal box from among the candidate boxes as the representative pattern shape. The candidate boxes that may be boxes representing the object are generated by dividing 360 degrees by predetermined intervals as shown in FIG. 11A. In an embodiment of the present disclosure, the angular interval is selected as an N degree interval, and thus, candidate boxes each having 360/N degrees are generated.

Thereafter, as shown in FIG. 11B, the candidate boxes are selected from among all candidate boxes by using detected contour. A segment that is a straight line between the outer points is extracted from an entire contour and a contour for each height. Angles of the extracted segments are calculated and a candidate box including a corresponding angle is selected.

In other words, a polygonal pattern shape of which one side includes one outer line among a plurality of outer lines is generated. The polygonal pattern shape takes a form of a rectangular box, and point data of the object is included in the polygonal pattern shape.

For example, polygonal pattern shapes 210, 220, 230, 240, 250, and 260 each including each of a plurality of the outer lines 131, 132, 133, 134, 135, and 136 generated in FIG. 8 as one side may be generated.

Since detecting optimal boxes for all the candidate boxes takes considerable computation time, according to an embodiment of the present disclosure, as shown in FIG. 12, an overlapping candidate box may be removed in order to improve a computation amount.

FIG. 12 illustrates a method of removing one of overlapping pattern shapes in an object shape detection method according to various embodiments of the present disclosure.

Referring to FIG. 12, from polygonal pattern shapes, one of the pattern shapes generated from outer lines perpendicular to each other among a plurality of outer lines is excluded.

When an angle between the two segments 131 and 134 are 90 degrees, and candidate boxes including points in the object are generated by using both angles, the same boxes are generated. Since the same boxes are generated, angles of all candidate boxes are reduced to 0 through 90 degrees, and one of candidate boxes having the same angle is removed.

Figure 13:
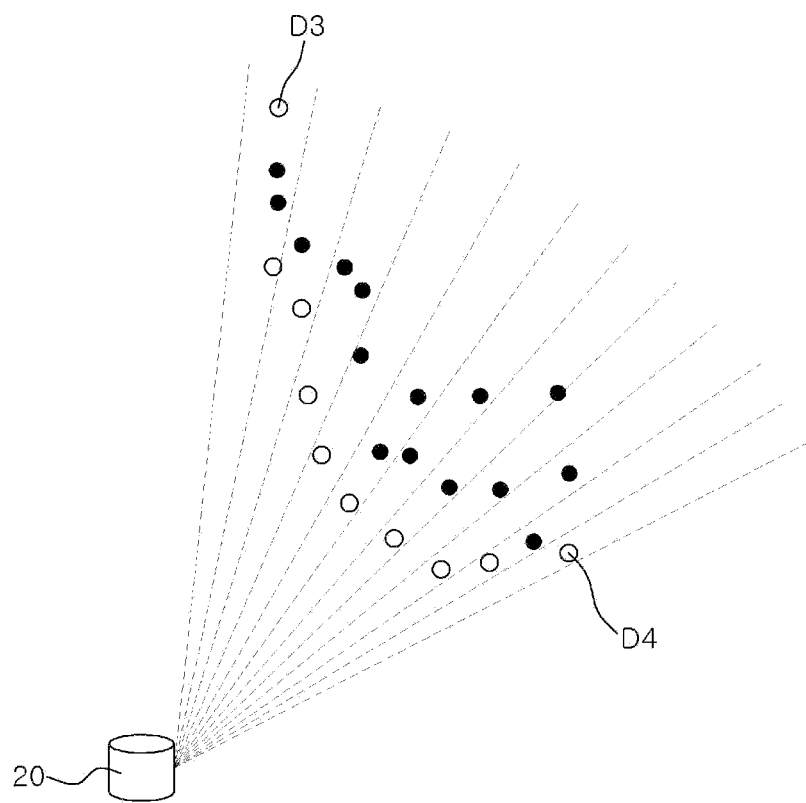
FIG. 13 shows a diagram illustrating a representative point in an object shape detection method according to an embodiment of the present disclosure.

FIG. 13 shows a diagram illustrating a representative point in an object shape detection method according to an embodiment of the present disclosure.

In order to select a representative pattern shape, an optimal box may be selected from among candidate boxes. Error values of the candidate boxes are calculated and a box having the minimum error value is selected. The error value is calculated by using a box and a point. Calculating the error value for the candidate box by using all the points may take a considerable amount of computation. In order to improve this problem, the present disclosure selects points capable of representing the object and uses the selected representative points to calculate the error value with the candidate box. The representative point uses hardware characteristics of a scanning sensor. Points within a predetermined angle based on a position of the sensor 20 are collected and a point, among corresponding points, at the closest position to the sensor 20 is selected as the representative point. In addition, two points D3 and D4 having the minimum angle and the maximum angle respectively among points within the object are selected as representative points.

Figure 14:
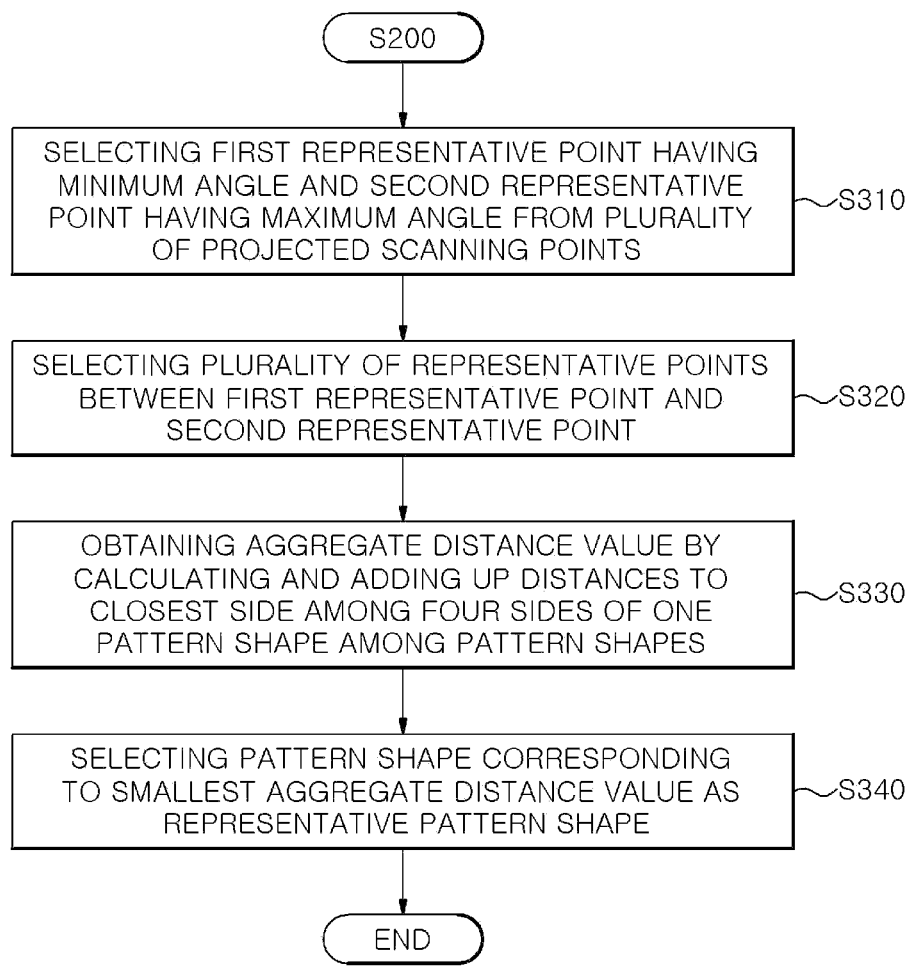
FIG. 14 shows a flowchart illustrating a step of selecting a representative pattern shape in an object shape detection method according to an embodiment of the present disclosure.

FIG. 14 shows a flowchart illustrating a step of selecting a representative pattern shape in an object shape detection method according to an embodiment of the present disclosure.

As shown in FIGS. 15A and 15B below, pattern shapes take a rectangular form including outer points therein, and the pattern shapes have different arrangement angles from each other.

Referring to FIG. 14, the step S300 of selecting the representative pattern shape in the object shape detection method according to an embodiment of the present disclosure includes a step S310 of selecting a first representative point having the minimum angle and a second representative point having the maximum angle from a plurality of projected scanning points. In a step S320, a plurality of representative points between the first representative point and the second representative point are further selected.

In a step S330, a distance from each of representative points including the first representative point, the second representative point, and the plurality of the representative points to the closest side among four sides of one pattern shape among the pattern shapes is calculated and added up to obtain an aggregate distance value.

In addition, the step of obtaining the aggregate distance value is repeatedly performed for each of remaining pattern shapes other than the one pattern shape.

In a step S340, a pattern shape corresponding to the smallest aggregate distance value among the aggregate distance values obtained for each pattern shape is selected as the representative pattern shape.

FIGS. 15A and 15B show a diagram illustrating a representative pattern shape in an object shape detection method according to an embodiment of the present disclosure.

In order to select an optimal box for representing the object among generated candidate boxes, error values with representative points are used. The error value of the candidate box is calculated by adding up error values of representative points in the box. As shown in FIG. 15A, each error value of representative points e, D3 and D4 is determined by calculating each of perpendicular distances to four sides of the candidate box 310 (for example, L3, L4, L5, and L6 in the case of the representative point e) and by selecting the shortest perpendicular distance as the error value of the corresponding representative point. In the case of the representative point e, the perpendicular distance L6 may be determined as the error value. In this way, the error values of the representative points in a candidate box are obtained, thereby calculating the error value of the candidate box.

As shown in FIG. 15B, the error values of the candidate boxes are calculated, and a candidate box having the minimum error value among the candidate boxes is determined as an optimal box representing the object to detect. In this case, the candidate box 320 may be a final representative pattern shape.

As shown in FIGS. 15A and 15B, the representative pattern shape in the object shape detection method according to an embodiment of the present disclosure includes a form of a rectangular box. In a case of a box among detected object shape information, it may be used to link the same object of the current time and the previous time when linking and tracking the object and used to estimate speed of the object. Further, in a case of object classification, various information may be used to classify objects. Among the various information, point information of the lidar sensor may be used importantly. However, since it takes considerable computation time if all point information is used, a problem of the computation amount may be solved through contour information for each height. Furthermore, when matching information of a high-definition map (HD map for autonomous driving) and lidar point information for localization, there is a problem that processing time is considerably long because of a large amount of computation. In this case, it is possible to have an advantage in calculation time by using an outer point or segment information of a contour of an object. In addition, it may help to identify an accurate position of an object when path generation and decision of driving situation.

The object shape detection apparatus 10 and the object shape detection method according to an embodiment of the present disclosure is a technology for rapidly and accurately detecting object shape information by using points input from a lidar sensor. A considerable amount of computation may be taken to detect the object shape information by using all points in the object. The object shape detection apparatus 10 and the object shape detection method according to an embodiment of the present disclosure not only improves computation speed by extracting contour of an object, selecting a candidate box based on the contour, and selecting representative points from among points within the object, but also provides more accurate shape information by detecting an optimal box having the minimum error value among candidate boxes capable of representing the object. In addition, there is an advantage to being able to provide the same calculation speed and the same result even in an environment in which various types of sensors or multiple sensors are installed.

Further, a storage medium storing a computer program including instructions for performing the object shape detection method including a step of generating each area estimated as an object from scanning information obtained by scanning around a moving object and obtaining line information of one object to extract a shape of the one object, a step of generating pattern shapes each of which one side includes at least part of the line information by using the line information, and a step of selecting a representative pattern shape corresponding to the shape of the one object from the generated pattern shapes by using the scanning information.

Furthermore, a computer program stored in a computer-readable storage medium including instructions for performing the object shape detection method including a step of generating each area estimated as an object from scanning information obtained by scanning around a moving object and obtaining line information of one object to extract a shape of the one object, a step of generating pattern shapes each of which one side includes at least part of the line information by using the line information, and a step of selecting a representative pattern shape corresponding to the shape of the one object from the generated pattern shapes by using the scanning information.

Such a computer-readable medium may include program instructions, data files, data structures, and the like alone or in combination. The program instructions recorded in the storage medium may be specially designed and configured for the present disclosure, or may be publicly known to those skilled in computer software to use. Examples of the computer-readable storage media include magnetic media such as hard disks, floppy disks, and magnetic tapes, optical media such as CD-ROMs and DVDs, magneto-optical media such as Floptical disks, and a hardware device specially configured to store and execute program instructions such as ROM, RAM, a flash memory, and the like. Examples of the program instructions include not only machine language codes such as those produced by a compiler, but also high-level language codes capable of being executed by a computer by using an interpreter or the like. The hardware device described above may be configured to operate as one or more software modules to perform the operation of the present disclosure, and vice versa.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

What is claimed is:

1. An object shape detection method performed by an object shape detection apparatus provided on a moving object of an autonomous driving vehicle in order to detect an object around the moving object, the object shape detection apparatus comprising a lidar sensor, a memory and a processor and the method comprising:
   obtaining, using the lidar sensor, scanning information comprising point data for a plurality of scanning points;
   storing, in the memory, the scanning information obtained from the lidar sensor; and
   detecting, using the processor, a shape of the object from the scanning information by:
      determining an area estimated as the object from the scanning information obtained by scanning around the moving object;
      obtaining line information of the object in order to extract a shape of the object;
      generating polygonal pattern shapes which include at least a part of the line information by using the line information; and
      selecting, from the polygonal pattern shapes, a representative pattern shape of the object corresponding to a shape of the object by using a distance from representative points among the plurality of the scanning points to each side of the polygonal pattern shapes, wherein the representative points are selected among the plurality of the scanning points based on a scanning angle of each scanning point.

2. The method of claim 1, wherein the point data includes three-dimensional coordinate information.

3. The method of claim 2, wherein the obtaining of the line information includes:
   projecting the plurality of the scanning points onto one plane; and
   determining outer points of the object from the plurality of the scanning points based on each polar coordinate of the point data in a case of converting two-dimensional coordinates of each data point from a corresponding coordinate system to a two-dimensional polar coordinate system around the moving object.

4. The method of claim 3, wherein the determining of the outer points of the object includes:
assigning index values to the plurality of scanning points sequentially according to a size of a scanning angle;
generating a first connection line based on an order in which the index values are assigned by connecting an $N_{th}$ point and an $N+2_{th}$ point, wherein N is a natural number greater than or equal to 1;
calculating a length of a second connection line connecting an $N+1_{th}$ point and a reference point that is two-dimensional coordinates of the lidar sensor; and
comparing a perpendicular distance from the reference point to the first connection line with the length of the second connection line and determining the $N+1_{th}$ point as an outer point if the length of the second connection line is shorter than the perpendicular distance.

5. The method of claim 3, wherein the obtaining the line information further includes generating each of a plurality of outer lines by connecting two outer points closest to each other among the outer points and obtaining the line information by connecting the plurality of outer lines.

6. The method of claim 5, wherein the generating the polygonal pattern shapes is generating a polygonal pattern shape which includes one outer line among the plurality of outer lines, and wherein all point data of the object is included in the polygonal pattern shape.

7. The method of claim 6, wherein the generating the polygonal pattern shapes comprises excluding, from the polygonal pattern shapes, one of the polygonal pattern shapes generated from outer lines perpendicular to each other among the plurality of outer lines.

8. The method of claim 5, wherein the polygonal pattern shapes take a rectangular form in which all the outer points are included, and each of the polygonal pattern shapes has a different arrangement angle from each other, and the selecting the representative pattern shape includes:
selecting a first representative point having a minimum angle and a second representative point having a maximum angle from among the plurality of scanning points;
selecting a plurality of representative points between the first representative point and the second representative point;
obtaining an aggregate distance value by calculating and adding up distances to a closest side among four sides of one pattern shape among the polygonal pattern shapes from each of all representative points including the first representative point and the second representative point and the plurality of representative points;
performing a step of the obtaining the aggregate distance value repeatedly for each polygonal pattern shape other than the one pattern shape; and
selecting, as the representative pattern shape, a pattern shape corresponding to a smallest aggregate distance value obtained for each pattern shape.

9. The method of claim 3, wherein the obtaining of the line information further includes, before the projecting the plurality of the scanning points onto the one plane, setting a predetermined height interval in a vertical direction, and classifying the plurality of the scanning points according to the predetermined height interval.

10. An object shape detection apparatus provided on a moving object of an autonomous driving vehicle to detect an object around the moving object, the apparatus comprising:
a lidar sensor configured to obtain scanning information comprising point data for a plurality of scanning points;
a memory configured to store the scanning information obtained from the lidar sensor; and
a processor configured to detect a shape of the object from the scanning information by:
determining an area estimated as the object from the scanning information,
obtaining line information of the object in order to extract a shape of the object,
generating polygonal pattern shapes which include at least a part of the line information by using the line information, and
selecting a representative patter shape corresponding to the shape of the object from the polygonal pattern shapes by using a distance from representative points among the plurality of the scanning points to each side of the polygonal pattern shapes, wherein the representative points are selected among the plurality of the scanning points based on a scanning angle of each scanning point.

11. A non-transitory computer-readable storage medium storing a computer program, wherein the computer program includes an instruction, when executed by a processor, causes the processor to perform an object shape detection method performed by an object shape detection apparatus provided on a moving object of an autonomous driving vehicle in order to detect an object around the moving object, the object shape detection apparatus comprising a lidar sensor, a memory and a processor and the method comprising:
obtaining, using the lidar sensor, scanning information comprising point data for a plurality of scanning points;
storing, in the memory, the scanning information obtained from the lidar sensor; and
detecting, using the processor, a shape of the object from the scanning information by:
determining an area estimated as the object from the scanning information obtained by scanning around a moving object;
obtaining line information of the object in order to extract a shape of the object;
generating polygonal pattern shapes which include at least a part of the line information by using the line information; and
selecting, from the polygonal pattern shapes, a representative pattern shape corresponding to the shape of the object by using a distance from representative points among the plurality of the scanning points to each side of the polygonal pattern shapes, wherein the representative points are selected among the plurality of the scanning points based on a scanning angle of each scanning point.

* * * * *